March 20, 1951 C. S. BATCHELOR 2,546,056
CLUTCH FACING AND METHOD OF MAKING SAME
Filed June 8, 1948
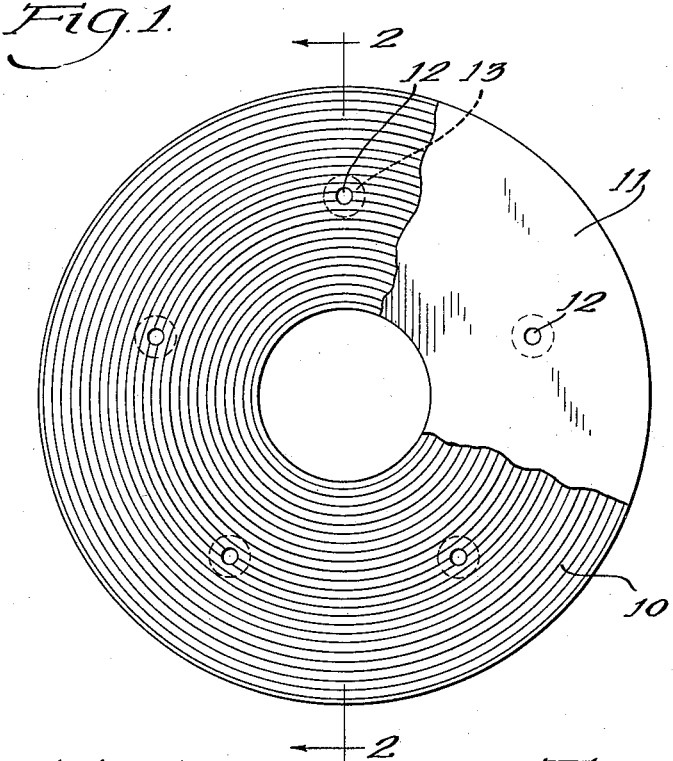
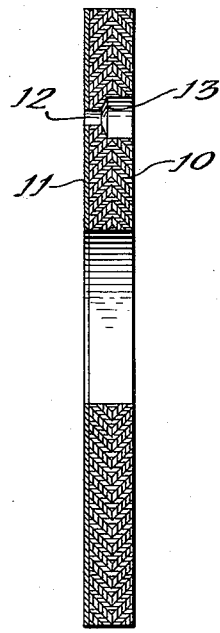
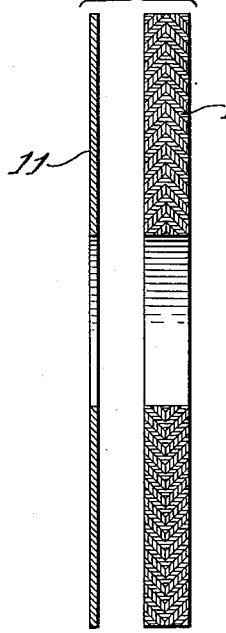
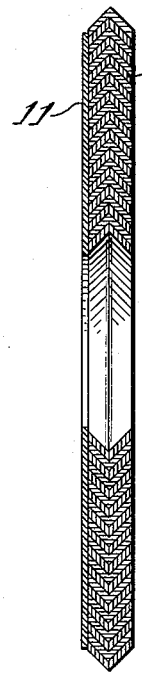
Inventor:
Clyde S. Batchelor
By: Lee J. Gary
Attorney Patented Mar. 20, 1951

2,546,056

UNITED STATES PATENT OFFICE 2,546,056

CLUTCH FACING AND METHOD OF MAKING SAME

Clyde S. Batchelor, Upper Stepney, Conn., assignor to Raybestos-Manhattan, Inc., Passaic, N. J., a corporation of New Jersey Application June 8, 1948, Serial No. 31,734

5 Claims. (Cl. 154—81)

This invention relates to the production of clutch facings of novel structure.

More particularly, the present invention relates to the production of clutch facings of composite structure or to the reinforcement of endless friction facings generally formed of strips of material wound in spiral fashion to form a coiled annulus.

It has been heretofore proposed to strengthen clutch facings of the class described against disruption by centrifugal force under high speed rotative operation by shaping or folding longitudinally a binder impregnated strip of fabric to impart to it an arcuate, V-shape or other deformed cross section prior to or while simultaneously coiling it spirally to form an annulus, as described, for example, in Cilley United States Patent 2,096,692. Although this does provide internesting of adjacent coils and thus has the tendency to break up planes of cleavage projecting or extending from one surface of the facing to the opposite surface thereof, I have found that under the conditions of high rotative speed developed by present day engines a tendency still remains for the windings to open up under operational stress and wear, which is accentuated and accelerated by such factors as changes or binder condition under heat generated in operation, wearing down of the friction facing, location of securing rivets and their tightness, and the like.

It is an object of the present invention to reinforce coiled clutch facings of the class described so as to minimize or eliminate the foregoing described potential difficulties or deficiencies and to provide other advantages as will be apparent from a consideration of the following specification and drawings. In general, I accomplish the objects of the present invention by bonding to one face of a coiled clutch facing of the class described, a coextensive fibrous backing sheet or layer formed of felted or woven material.

Fig. 1 is a plan view, with part broken away, of a reinforced coiled clutch facing, in accordance with the present invention.

Fig. 2 is a sectional view on the line 2—2 of Fig. 1.

Fig. 3 is a sectional view similar to that of Fig. 2, but illustrating a separately finished coiled clutch facing and reinforcing backing prior to their being bonded together.

Fig. 4 is also a view similar to that of Fig. 2, but illustrating a composite of a coiled element and a reinforcing backing in assembled relationship but prior to binder cure and finishing.

Referring to the drawings, and particularly Fig. 4, the coiled component 10 may be formed by impregnating a strip of open-mesh asbestos or other fabric with a heat-hardenable binder, such as, for example, a thermosetting resin or other curable or heat-hardenable binder or binder composition well known in the friction material art, and then folding the strip longitudinally into chevron form in cross section and winding the shaped fabric strip into the form of a coiled annulus with the adjacent convolutions in internesting relationship, as described in said Patent 2,096,692. Although not shown, it will be understood that the fabric strip may be longitudinally shaped to provide other deformed cross sections, such as, for example a W-shape, or an arcuate shape. As a further non-fully equivalent alternative, my present individual may be advantageously applied to a coiled strip without longitudinal shaping thereof.

In one specific embodiment of my invention, as, for example, illustrated in Fig. 3, the coiled annulus can then be subjected to heat and pressure by suitable means, such as, for example, in a mold to densify it and to heat-harden or cure the binder content, after which it may be subjected to a finishing operation such as grinding for the purpose of bringing it to a substantially uniform thickness and to bring out the desired friction characteristics on at least the ultimate operative face, as described in Patent 2,096,692. For the purpose of reinforcing this clutch facing in accordance with my invention, as hereinbefore described, I thereafter bond to one surface thereof a coextensive annular reinforcing sheet or disc 11 composed of one or more plies of fibrous material, such as, for example, "whole cloth" or woven fabric, which may be of the same general character comprising the strip material wound into a coil 10, impregnated with a similar heat-hardenable binder or I may employ felted sheet material such as that composed of an asbestos or other fibrous composition pulp, impregnated with or formed with a binder such as a heat-hardenable or thermosetting binder. In this embodiment of my invention, the reinforcing element 11 may likewise be separately formed and finished, that is, it may be subjected to theatment in a hot press or mold to densify the sheet material and to cure the binder content. These two separately formed components are then joined together by means of suitable bonding cement, such as, for example, a thermosetting synthetic resin, a resin-rubber composition or a rubber bonding cement, with the employment of suitable means such as a hot press for adequate pressure to hold the two components together and for time and temperature adequate to cure or heat-harden the bonding cement.

In the embodiment of my invention shown in Fig. 4, the two components, namely the coiled annulus 10 and the reinforcing backing 11 may be joined together before complete finishing of the respective components. That is, the coiled annulus 10 and the reinforcing backing 11, together with an interposed layer of the bonding cement, as previously described, may be assembled before cure of the binder content of the coil 10 or after only partial cure thereof, the whole assembly placed in a suitable mold and there subjected to densifying pressure and heat for a time adequate to cure the binder content in the coil 10 or after only partial cure thereof, the whole assembly placed in a suitable mold and there subjected to densifying pressure and heat for a time adequate to cure the binder content in the coil 10 and in the reinforcing backing 11, and the bonding cement interposed therebetween. Thereafter, this unit may be subjected to suitable finishing and grinding operations, as previously described.

One of the further finishing operations necessary in either method of assembly is the provision of rivet holes 12 generally provided with counter bores 13, by, for example, drilling, for reception of attaching rivets for securing the clutch facing to a suitable clutch plate, not shown. Conventionally, the drilling of a plurality of such rivet holes, even though staggered, weakens the clutch facing and may provide a plurality of points for the starting and spreading of cracks, leading to separation and rupture of the coils under high speeds and resultant conditions of operational wear and frictional heat. Although the formation of these coiled clutch facings of strips which have been longitudinally deformed has a tendency to prevent such failure and the prevention of incipient planes of cleavage from one face to the opposite face, it has nevertheless been found that, under present day conditions of high speed engines, wearing of the facing and change in binder character due to high heat of friction such failures of the clutch facing in use still result. This condition is particularly accentuated when the rivet holes are bored or when the rivets land at junctures between adjacent coils. This condition is further aggravated by attempts to tighten and properly anchor the rivets so that when attempts are made to unduly tighten them, splitting or spreading of the convolutions may occur even before actual use, and even though these may not be initially apparent, they become progressively aggravated under the stress and conditions of usage described.

In accordance with the present invention, by employing a reinforcing backing, the general plane of which is normal to the general plane of the windings, securely bonded thereto, disintegration of the coiled component by splitting or separation of the convolutions, either under initial tightening of the rivets or under high centrifugal force, wear, and binder change under operative use is sharply minimized or completely eliminated, and the bursting or centrifugal strength of the unit is greatly increased and incipient planes of cleavage from face to face truly eliminated. In addition, the danger of cracking or coil-separation resulting from the boring of the rivet holes is minimized, less accuracy in their positioning required, and further when employing the construction of my invention, the rivets not only may be tightened to a greater degree, without danger of splitting or spreading the convolutions, but in addition they may now be pushed down further and tighter to get a better anchorage, while at the same time enhancing or lengthening the life of the clutch facing by providing or leaving a greater wearing thickness before reaching the rivet heads.

I claim as my invention:

1. An endless clutch facing comprising a spirally wound fibrous fabric strip and a fibrous fabric sheet bonded to and coextensive with one of the faces of said wound component.

2. An endless clutch facing comprising a spirally wound fibrous fabric strip and a woven fibrous fabric sheet bonded to and coextensive with one of the faces of said wound component.

3. An endless clutch facing comprising a spirally wound fibrous fabric strip and a felted fibrous fabric sheet bonded to and coextensive with one of the faces of said wound component.

4. An endless clutch facing comprising a spirally coiled strip of fibrous fabric, the convolutions thereof being secured together in internesting relation, and a fibrous fabric sheet coextensive with and secured to one of the faces of said coiled component, the whole being impregnated with a hardened binder.

5. The method of reinforcing a clutch facing formed of a spiral coil of fibrous fabric strip material, which comprises bonding to one of its faces a coextensive fibrous fabric sheet.

CLYDE S. BATCHELOR.

REFERENCES CITED

The following references are of record in the file of this patent:

UNITED STATES PATENTS

| Number | Name | Date |
|---|---|---|
| 1,213,051 | Wickes | Jan. 16, 1917 |
| 1,604,985 | Frood et al. | Nov. 2, 1926 |
| 2,096,692 | Cilley | Oct. 19, 1937 |
| 2,175,399 | Judd | Oct. 10, 1939 |